UNITED STATES PATENT OFFICE.

GIULIA DE ANGELIS, OF NAPLES, ITALY.

HEAT-RESISTING COMPOSITION.

No. 869,694.  Specification of Letters Patent.  Patented Oct. 29, 1907.

Application filed February 10, 1906. Serial No. 300,518.

*To all whom it may concern:*

Be it known that GIULIA DE ANGELIS, née DE VECCHI, a subject of the King of Italy, residing at 50 San Bartolomeo, Naples, in the Kingdom of Italy, married woman, has invented certain new and useful Improved Heat-Resisting Composition, of which the following is a specification.

My invention relates to a novel protective product for prevention of radiation of heat intended for use alike for covering heated bodies to prevent their cooling and for preventing the heating of bodies contained in receptacles such as refrigerators.

My invention contemplates use chiefly of cellulose, and carbonate and oxid of magnesium mixed with water. Necessarily the composition preferred differs slightly with the intended use. These ingredients are used preferably in the proportions of 40 parts cellulose to 50 parts of carbonate of magnesium and 10 parts of oxid of magnesium with the addition of water, etc., as hereinafter set forth. In the case of high temperatures, filamentous asbestos should be used for the cellulose. In mixing these materials, I combine with the water raw alum, boric acid, and gelatin or starch or casein, using preferably 5 to 10 parts of alum, 15 to 30 parts of boric acid and 5 to 15 parts of gelatin or its equivalent and 100 to 200 parts of water. These are preferably mixed separately and combined with the cellulose and oxid and carbonate of magnesium, but the proportions of the several elements vary according to the density that is desired and as much as 1,000 parts of water may be added to the proportions given. For a refractory layer whose temperature will not exceed 200° C., wood, cork, dust and soot may be added in various proportions as a measure of economy and to increase the strength.

In commercial manufacture, the proportions given by me have been found to be quite desirable. I mix the oxid of magnesium, carbonate of magnesium and cellulose and knead it with a solution of water, raw alum, boric acid, gelatin or starch or casein, reducing the paste to small globules, which are dried in the sun or by heated air. This paste is then pounded to reduce it to a powder, which is then mixed with a second quantity of oxid and magnesium and carbonate of magnesium, each about one-twentieth (1/20), in which form it is ready for use or sale, requiring only that it be mixed with water to the required consistency for use. The product thus obtained presents a specific gravity of about one-third (1/3) that of water and for a required thickness of one centimeter but two kilograms of the substance per square meter of surface to be covered is required.

What I claim and desire to secure by Letters Patent of the United States is:—

1. As a new article of manufacture, a heat resisting composition comprising a mixture of cellulose, carbonate of magnesium, and oxid of magnesium to which has been added a mixture of water, alum, boric acid and gelatinous material.

2. The method of making a heat resisting composition, which consists in mixing together oxid of magnesium, carbonate of magnesium, and cellulose, kneading this mixture with a solution of water, alum, boric acid and gelatinous material, then drying the mixture and reducing it to a powder, and then adding a mixture of oxid of magnesium and carbonate of magnesium.

3. The method of making a heat resisting composition, which consists in mixing together oxid of magnesium, carbonate of magnesium, wood dust, soot, and cellulose, kneading this mixture with a solution of water, alum, boric acid and gelatinous material, then drying the mixture and reducing it to a powder, and then adding a mixture of oxid of magnesium and carbonate of magnesium.

In testimony whereof I have hereunto set my hand in presence of two subscribing witnesses this 23d day of January, 1906.

GIULIA DE ANGELIS.

Witnesses:
ALBERTO PEGASSANI,
FRANCESCO SCIDI.